United States Patent [19]

Osberghaus et al.

[11] Patent Number: 4,661,170

[45] Date of Patent: Apr. 28, 1987

[54] METHOD AND COMPOSITION FOR PRESERVING ALUMINUM SURFACES

[75] Inventors: Rainer Osberghaus; Dieter Brodalla, both of Duesseldorf; Roland Geissler, Erkrath; Harald Bossek, Duesseldorf, all of Fed. Rep. of Germany

[73] Assignee: Henkel Kommanditgesellschaft auf Aktien, Duesseldorf, Fed. Rep. of Germany

[21] Appl. No.: 777,128

[22] Filed: Sep. 18, 1985

[30] Foreign Application Priority Data

Sep. 21, 1984 [DE] Fed. Rep. of Germany ....... 3434668

[51] Int. Cl.$^4$ .................... C23C 25/26; C25D 11/24
[52] U.S. Cl. ................... 148/6.27; 204/37.6; 204/38.3
[58] Field of Search ............. 204/37.6, 38.3; 148/6.27

[56] References Cited

U.S. PATENT DOCUMENTS

| | | | |
|---|---|---|---|
| 2,754,280 | 7/1956 | Brown et al. | 260/29.6 |
| 2,795,564 | 6/1957 | Conn et al. | 260/29.6 |
| 3,756,999 | 9/1973 | Stetter et al. | 260/88.2 |
| 3,961,111 | 6/1976 | Smith | 204/37.6 |
| 4,465,562 | 8/1984 | Kadooda | 204/38 A |
| 4,529,762 | 7/1985 | Hoefer et al. | 524/157 |

FOREIGN PATENT DOCUMENTS

| | | | |
|---|---|---|---|
| 2830581 | 2/1979 | Fed. Rep. of Germany | 204/38.3 |
| 3024727 | 1/1982 | Fed. Rep. of Germany | |

*Primary Examiner*—Sam Silverberg
*Attorney, Agent, or Firm*—Ernest G. Szoke; Henry E. Millson, Jr.; Mark A. Greenfield

[57] ABSTRACT

Preservatives for aluminum surfaces in the form of a polymer dispersion based on an acid-group-containing acrylate copolymer which is cross-linked with divalent metal salts, which contains plasticizers and surfactants, and which, optionally, contains oxidized polyethylene and/or a copolymer of styrene and maleic acid anhydride. The preservatives are suitable for the preserving aftertreatment of aluminum, particularly electrolytically oxidized aluminum.

25 Claims, No Drawings

METHOD AND COMPOSITION FOR PRESERVING ALUMINUM SURFACES

BACKGROUND OF THE INVENTION

1. Field of the Invention

The present invention relates to a method and composition for preserving the surfaces of aluminium, and particularly the surfaces of anodized aluminium.

2. Description of Related Art

Despite the well known resistance to corrosion of aluminium and more particularly, electrolytically oxidized aluminium, it is recognized that aluminium components which are exposed to external weathering or to aggressive media should additionally be protected by a preserving coating.

Thus, it is proposed in U.S. Pat. No. 4,465,562 to immerse aluminium which has been anodically oxidized, but not surface-sealed, in an acidic polymer latex which irreversibly deposits a polymer layer on the surface of the aluminium. The disadvantages of this process lie in the fact that it can only be applied immediately after the anodic oxidation step and that the articles thus coated do not have the surface quality obtained by controlled, uniform sealing of the anodically produced oxide layer.

Another process for preserving aluminium surfaces is described in German Pat. No. 3,024,727 which proposes using a metal salt-containing dispersion containing 10 to 25% by weight of acrylate copolymers in fully deionized water as a preservative for electrolytically oxidized aluminium surfaces. However, this German Patent contains only a broad, vague technical teaching which does not enable one skilled in the art to preserve aluminium components by a uniform, streak-free coating without inventive activity. Nor is there any disclosure in the above German Patent to immersion treatment, which is a particularly desirable method of carrying out such surface sealing of aluminium.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide a polymer dispersion and method for the improved, uniform preservation of aluminium components by spread-coating or immersion-coating.

The present invention relates to the use of an aqueous polymer dispersion of

A. from 40 to 90% by weight of water,
B. from 5 to 40% by weight of an acid group-containing acrylate copolymer having a minimum film-forming temperature of from 30° to 90° C.,
C. from 0.5 to 3% by weight of at least one organic salt of a divalent metal,
D. from 0.5 to 5% by weight of at least one nonvolatile, permanent plasticizer,
E. from 1 to 25% by weight of at least one volatile plasticizer,
F. from 0.2 to 5% by weight of at least one anionic and/or nonionic surfactant, of which from 0.05 to 1% by weight, based on the total weight of the dispersion, is a fluorine surfactant, and, optionally, G. from 1.5 to 8% by weight of oxidized polyethylene in aqueous emulsified form, and/or
H. from 1.5 to 8% by weight of a copolymer of styrene and maleic acid anhydride, for the preserving aftertreatment of anodized aluminium surfaces. The above percentages are based on the total weight of the aqeuous dispersion.

The present invention also relates to an immersion process in which aluminium components are immersed in the above dispersion diluted to a nonaqueous components content of from 0.5 to 10% by weight. After draining, the aluminium components are dried.

The polymer dispersions used in accordance with the invention contain as their most important constituent (component B) an acrylate copolymer of from 1 to 15 parts by weight, based on the copolymer, of monomers containing acid groups; from 30 to 69 parts by weight, based on the copolymer, of monomers which form homopolymers having a glass temperature below 20° C., especially esters of acrylic acid with $C_1$–$C_8$ alkanols or esters of methacrylic acid with $C_4$–$C_8$ alkanols; and from 30 to 69 parts by weight based on the copolymer, of comonomers which form homopolymers having a glass temperature above 20° C., especially methacrylic acid esters with from $C_1$ to $C_3$ alkanols, or styrene.

The acid group-containing comonomers used in forming component B can be ethylenically unsaturated carboxylic acids or ethylenically unsaturated acids of sulfur. Suitable ethylenically unsaturated carboxylic acids include acrylic acid, methacrylic acid, itaconic acid, and maleic acid and semiesters thereof. Acrylic acid and maethacrylic acid are preferred. Examples of unsaturated acids of sulfur include 2-acrylamido-2-methylpropane sulfonic acid (AMPS), and vinyl sulfonic acid.

Suitable comonomers having a glass temperature below 20° C., i.e. below room temperature (based in each case on homopolymers of a monomer), that can be employed in forming component B are esters of acrylic acid with $C_1$–$C_8$ alcohols and esters of methacrylic acid with $C_4$–$C_8$ alcohols. Thus, it is possible to use the methyl, ethyl, propyl, butyl or 2-ethylhexyl ester of acrylic acid and also the butyl, hexyl or 2-ethylhexyl ester of methacrylic acid. Comonomers of which the homopolymers have glass temperatures above room temperature that can be employed in forming component B are esters of methacrylic acid with $C_1$–$C_3$ alcohols, such as for example methylmethacrylate or ethylmethacrylate. One particularly important comonomer of which the homopolymer has a glass temperature above room temperature is styrene. In this connection, it has been found that the method of the invention affords particular advantages when the acrylate copolymer of the polymer dispersion contains styrene. The copolymers used in accordance with the invention can contain one or more monomers from each of the three monomer classes. Particularly favorable combinations are:

acrylic acid, butylacrylate, methylmethacrylate;
methacrylic acid, ethylacrylate, methylmethacrylate;
acrylic acid, butylacrylate, styrene;
acrylic acid, butylacrylate, methylmethacrylate, styrene.

The ratios between the comonomers of which the homopolymers have glass temperatures below room temperature and monomers of which the homopolymers have glass temperatures above room temperature have to be adjusted in such a way that the film-forming temperature of the polymer dispersion is between 30° and 90° C., and preferably between 40° and 70° C. General knowledge of polymer chemistry is sufficient for that purpose. The above-mentioned film-forming temperatures apply to the plasticizer-free system, i.e. to the starting polymer dispersion without any additives.

The copolymers are best prepared by emulsion polymerization of the various monomers in the corresponding quantities, optionally in the presence of chaintransfer agents which reduce molecular weight. In this connection, it has been found that the use of polymer dispersions which have been prepared in the presence of chain transfer agents ultimately results in the formation of coatings of relatively high gloss. Suitable chain transfer agents are, for example, aliphatic mercaptans containing from 4 to 12 carbon atoms, for example linear or branched C12 mercaptans, and also halogenated hydrocarbons, such as for example trichloromethane, tetrachloromethane, tetrachloroethylene, trifluoromethane or butyl chlorite. Other suitable chain transfer agents are thioglycolic acid and isopropylbenzene mercaptoethanol.

Standard emulsion polymerization methods are described in U.S. Pat. Nos. 2,754,280 and 2,795,564. One polymerization process using a chaintransfer agent is described by E. H. Riddle in "Monomeric Acrylic Esters", pages 56 et seq. (Reinhold Publishing Corp., New York, N.Y. 1954). The monomers can be emulsified using an anionic, cationic or nonionic emulsifier, with the emulsifier being used in a quantity of from 0.5 to 10% by weight, based on the weight of the monomers as a whole. The acidic monomer is normally soluble in water, so that the emulsifier is used to emulsify the other monomers. A polymerization initiator of the free radical donor type, such as for example ammonium or potassium persulfate, can be used either alone or in conjunction with an accelerator, such as for example potassium metabisulfite or sodium thiosulfate. Organic peroxides, such as for example benzoyl peroxide or tert.-butyl hydroperoxide, are also suitable initiators. The initiator and the accelerator, usually called the catalyst in the interests of simplicity, can be used in quantities of from 0.1 to 3% by weight, based in either case on the weight of the monomers to be copolymerized. The polymerization temperature can be between room temperature and the boiling point of the monomers and is normally around 60° C.

Single emulsifiers (dispersants) suitable for carrying out emulsion polymerizations are any of the anionic types, such as for example the sodium salts of fatty alcohol sulfates, alkyl phenol sulfates, alkylbenzene sulfates, sulfates of ethoxylated fatty alcohols or ethoxylated alkyl phenols, sulfosuccinic acid semiesters and esters of fatty alcohols. Alkyl phenols or ethoxylated fatty alcohols or ethoxylated alkyl phenols can also be employed. It is also possible to use nonionic emulsifiers, for example ethylene oxide adducts with alkyl phenols, fatty alcohols, or polypropylene glycols.

The copolymer content (component B) of the polymer dispersion used in accordance with the invention amounts to between 5 and 40% by weight, and preferably to between 15 and 30% by weight.

The at least one organic salt of a divalent metal (component C) can be used either as such or as a complex with ammonia or amines. Suitable salts are derived from the following metals: beryllium, cadmium, copper, calcium, magnesium, zinc, zirconium, barium, strontium, cobalt, iron and nickel. The magnesium, zinc and zirconium compounds are preferred. The suitability of the compound is based on high solubility in water. The choice of a suitable metal and of the anion is thus determined by the solubility of the metal salt or of the metal complex obtained to ensure that adequate stability of the formulation is achieved. The ammonia and amine complexes of zinc and zirconium are preferred. Amines, which are suitable in this way for complexing, are for example morpholine, monoethanolamine, diethanolamine and ethylene diamine. Suitable anions are, for example, acetate, glutamate, formate, carbonate, salicylate, glycolate, octoate, benzoate, gluconate, oxalate and lactate. Polyvalent metal chelates, in which the ligand is a bidentate amino acid, such as for example glycine or alanine, can also be used. The polyvalent metal compounds have to be selected in such a way that the metal is capable of performing its crosslinking function, i.e. the metal compound is capable of dissociating to form ions containing polyvalent metals. In addition, the formulations have to be coordinated in such a way that the final polymer dispersions are stable in storage.

In one particularly preferred embodiment of the invention, zinc ammonium acetate, zinc ammonium carbonate, or zirconyl ammonium carbonate is used. To this end, complex salt solutions containing 5 to 10% by weight of zinc or zirconium are prepared. These solutions are prepared by dissolving a zinc or zirconium salt, preferably the acetate or carbonate, in water, adding ammonium hydroxide and stirring the mixture until the solution is substantially clear. The organic salts of divalent metals are used in such quantities that the ratio of the divalent metal to the ethylenically unsaturated acid of the copolymer varies from 0.05 to 0.5 and preferably from 0.2 to 0.3. This is expressed as the ratio of metal, for example $Zn^{2+}$, to the group —COOH or —$SO_3H$, a ratio of 0.5 being stoichiometric. To achieve this, the organic metal salts are generally used in a quantity of from 0.5 to 3% by weight.

The polymer dispersions used in accordance with the invention contain at least one nonvolatile, permanent plasticizer in amounts of from 0.5 to 5% by weight (component D). Suitable nonvolatile permanent plasticizers are phthalic acid esters, phosphoric acid esters, esters of acyclic aliphatic dicarboxylic acids and polyesters of aliphatic and/or aromatic dicarboxylic acids having molecular weights of from 850 to 8000, fatty acid esters and/or citric acid esters. Examples include benzyl and butyl phthalate, dibutyl phthalate, dimethyl phthalate, triphenyl phosphate, 2-ethylhexylbenzyl phthalate, butyl cyclohexyl phthalate, mixed benzoic acid and/or fatty acid esters of pentaerythritol, poly(propyleneadipate) dibenzoate, diethylene glycol dibenzoate, caprolactam, tetrabutyl thiodisuccinate, butyl pthalylbutyl glycolate, acetyl tributyl citrate, benzyl sebacate, tricresyl phosphate, toluene ethyl sulfonamide, tributoxyethyl phosphate and/or tributyl phosphate.

The polymer dispersions used in accordance with the invention also contain at least one volatile liquid (temporary) plasticizer (component E) in amounts of from 1 to 25% by weight, preferably from 5 to 25% by weight, and more preferably from 5 to 20% by weight, based on the dispersion. Suitable are ethylene glycol, propylene glycol, their dimers or trimers, and mono- or dialkylethers of the foregoing with $C_1$–$C_6$ alkanols. Specific examples of such liquid, temporary plasticizers (also known as flow promoters) include the monobutyl, monoethyl or monomethyl ethers or other monoalkyl ethers of diethylene glycol or dipropylene glycol, isophorone, benzyl alcohol, diglycol methyl ether, butyl cellusolve, and 3-methoxy-l-butanol. These products can be described generally as water-soluble, high-boiling (approx. 150° to 200° C.) monohydric or polyhydric alcohols and as lower ($C_1$–$C_5$ alkyl) monoethers and diethers of glycols and diglycols.

The polymer dispersions used in accordance with the invention also contain from 0.2 to 5% by weight of at least one and/or nonionic surfactant (component F), of which from 0.05 to 1% by weight, based on the dispersion as a whole, consists of one or more fluorine surfactants. Suitable surfactants of this type are the anionic and/or nonionic surfactants used for emulsion polymerization. Thus, the above-mentioned ethoxylates of fatty alcohols, particularly coconut oil fatty alcohol or tallow alcohol, and also ethoxylates of alkyl phenols, for example octyl or nonyl phenols can be employed herein. Suitable ethoxylates contain from 2 to 20 and, more particularly, from 5 to 10 units of ethylene oxide per mole of long-chain component. The sulfates and/or sulfonates of the above-mentioned nonionic emulsifiers are also suitable. To obtain a uniform surface, it is particularly preferred to use alkyl benzene sulfonates containing from 8 to 12 carbon atoms in the alkyl chain.

As stated above, Component F also contains fluorine surfactants. Suitable fluorine surfactants are compounds containing a perfluorinated $C_6$–$C_{12}$ alkyl chain and a hydrophilic group, for example the —COOH group, the —$SO_3H$ group and/or a —CONHR group, in which R represents lower alkyl ($C_1$–$C_3$ non-fluorinated) or hydrogen.

In another embodiment of the invention, the polymer dispersions used can contain optional component G, i.e. from 1.5 to 8% by weight of an oxidized polyethylene. The oxidized polyethylene is a low-pressure polyethylene which has preferably been produced by the Phillips process and which, after oxidative cracking, has an average chain length of from 200 to 800 carbon atoms and a molecular weight of from about 1000 to 10,000 and preferably from 2000 to 5000. This material may be produced in accordance with German Application No. 20 35 706. It is preferred to use a substantially linear, crystalline, hard and dense polyethylene having a high softening point. These characteristics remain intact in the oxidized polyethylene, so that products having substantially the following properties are preferably used:

hardness: 0.5 dmm (needle penetrometer hardness according to ASTMD 1321 [D-5], 100 g/5 secs./25° C.) softening point: 138 to 147° C. (according to ASTM E-28)

$D_{20}$:0.99 viscosity: 9000 cP at 149° C. or 1500 cP at 140° C. (Brookfield).

In accordance with the invention, the oxidized polyethylene is used in emulsified form. To this end, the oxidized polyethylene (in the form of a wax) is preferably emulsified under pressure at elevated temperature in the presence of a nonionic emulsifier and a neutralizing agent and, if desired, a relatively long chain glycol ether. A typical wax emulsion consists, for example, of:
oxidized polyethylene, 19.1% by weight
octylphenol-10 EO (ethylene oxide), 4.7% by weight
ethylene glycol monobutylether, 2.2% by weight
potassium hydroxide, 0.5% by weight
sodium thiosulfate, 0.2% by weight
demineralized water, 73.3% by weight.

In either case, emulsification is carried out above the melting point of the oxidized polyethylene. Thus, the above-mentioned mixture can be emulsified at 130° C. under the vapor pressure of the systems.

The polymer dispersion used in accordance with the invention can also optionally contain from 1.5 to 8% by weight of a copolymer of styrene and maleic acid anhydride (component H) containing from 20 to 50 mole % of maleic acid anhydride units, maleic acid units or alkali or ammonium salts thereof. Suitable products of this type have a relatively low molecular weight, more particularly a molecular weight of from 1500 to 3500, and an average acid number of from 200 to 300. It is particularly preferred to use the ammonium salts.

The polymer dispersions used in accordance with the invention should have a pH-value of from 6 to 9 and, more particularly, from 7 to 8.5. To this end, excess acid groups are neutralized with alkali hydroxide, ammonium hydroxide or with amines. Neutralization with ammonia is preferred.

The polymer dispersions in accordance with the invention are used for the preserving aftertreatment of aluminium. In the context of the invention, aluminium is understood to be primarily electrolytically oxidized aluminium, including the usual alloys in which aluminium is the main component or which at least contain aluminium. Aluminium articles having a non-sealed surface or a surface which has not been produced by anodic oxidation can also be preserved.

To carry out the method of the invention, the polymer dispersions are diluted to a nonaqueous components (solids) content of from 10 to 25% by weight and are applied to the aluminium articles to be treated at ambient temperature by wiping, brushing or with sponges. In another embodiment of the invention, the aluminium articles can also be contacted with the polymer dispersion by immersion in the dispersion, which is maintained at ambient temperature. In this case, it has proved to be of advantage to dilute the dispersions to an even lower solids content, for example to a solids content of from 0.5 to 10% by weight and, preferably, to a solids content of from 1 to 3% by weight. After the treatment, the immersed components are allowed to drain and are then dried. The drying temperature should be above the film-forming temperature of the polymer dispersion. Drying temperatures above about 5° C. can be employed herein.

The invention will be illustrated by the following examples, which are given for that purpose only and not for purposes of limitation.

EXAMPLES

1. Production of the stock dispersions

Polymer dispersions having a solids content of 40% by weight were prepared from the following monomers (quantities in percent by weight) using the emulsion polymerization process of Example IV of U.S. Pat. No. 4,529,762, issued July 16, 1985 to Hoefer et al, using emulsifier No. 1 thereof. The process conditions and materials employed in Example IV of said patent were used herein except that the monomers were as given below with a total weight of monomers of 445 g.

1a

60% of styrene
35% of butyl-acrylate
5% of acrylic acid

1b

50% of styrene
30% of butyl-acrylate
17% of ethyl-acrylate
3% of methacrylic acid 1c 40% of styrene
58% of ethyl-acrylate
2% of acrylic acid 1d 50% of methyl-methacrylate
25% of butyl-acrylate
20% of ethyl-acrylate
5% of methacrylic acid 1e 50% of methyl-methacrylate
30% of ethyl-acrylate
19% of butyl-acrylate
1% of acrylic acid 1f 60% of methyl-methacrylate
39% of butyl-acrylate
1% of methacrylic acid Dispersions 1a to 1f were adjusted with ammonia to pH 8-9. An ammoniacal zinc acetate solution (approx. 10% by weight of $Zn(NH_3)_4(CH_3COO)_2$) was then added in a quantity of 1 mole of Zn per 2.5 moles of —COOH groups, followed by dilution to a solids content of 25% by weight.

2. To prepare the polymer dispersion used in accordance with the invention, the following constituents were mixed together:

75% by weight of polymer dispersion a to f, containing Zn
3% by weight of tributoxyethyl phosphate
5% by weight of ethylene glycol monobutyl ether
1% by weight of nonylphenol-10-EO
3% by weight of alkylbenzene sulfonate
0.1 % by weight of $C_8F_{17}$-COOK
and water to 100% by weight.

3. An emulsion of an oxidized polyethylene having a solids content of 12% was prepared in accordance with German Application No. 19 43 958, Example 2.

4. Examples 2a to 2f were repeated, but using only 60 parts by weight as opposed to 75 parts by weight of polymer dispersions a to f and also 15 parts by weight of the wax dispersion of Example 3.

5. Example 4 was repeated, except that the 15 parts by weight of the wax emulsion were replaced by 15 parts by weight of a 30% ammoniacal solution of a copolymer of styrene, maleic acid and maleic acid monomethyl ester (monomer ratio by weight 4:1:1), molecular weight approx. 2000.

6. Dispersions 2a to f, 4a to f and 5a to f were applied with a sponge to brown facing panels of electrolytically oxidized aluminium. Uniform, dirtrepellent coatings were obtained after drying.

7. The dispersions of Examples 2, 4 and 5 were diluted with a 0.5% by weight alkylbenzene sulfonate solution in ratios of 1:5 and 1:10. After draining and drying, components of electrolytically oxidized aluminum immersed in those dispersions showed a uniform coating which, when exposed to external weathering, proved to be dirt-repellent and protective.

What is claimed is:

1. A method for preserving aluminum surfaces comprising applying thereto an aqueous polymer dispersion in diluted form, wherein the aqueous polymer dispersion consists essentially of
   A. from about 40 to about 90% by weight of water,
   B. from about 5 to about 40% by weight of an acid group-containing acrylate copolymer having a minimum film-forming temperature of from about 30 to about 90° C.,
   C. from about 0.5 to about 3% by weight of at least one ammonium or organic salt of a divalent metal which is a beryllim, cadmium, copper, calcium, magnesium, zinc, zirconium, barium, strontium, cobalt, iron, nickel, or a mixture thereof,
   D. from about 0.5 to about 5% by weight of at least one nonvolatile plasticizer,
   E. from about 1 to about 25% by weight of at least one volatile plasticizer,
   F. from about 0.2 to about 5% by weight of at least one anionic surfactant, noionic surfactant, or mixture thereof, and wherein from about 0.05 to about 1% by weight, based on the aqueous polymer dispersion, is a fluorine containing surfactant, and optionally, one or both of
   G. from about 1.5 to about 8% by weight of oxidized polyethylene, and
   H. from about 1.5 to about 8% by weight of a copolymer of styrene and maleic acid anhydride,
and wherein the diluted form of said polymer dispersion contains a nonaqueous ingredient content of from about 0.5 to about 25% by weight.

2. A method in accordance with claim 1 wherein the aluminum surface is an electrically oxidized aluminum surface.

3. A method in accordance with claim 1 wherein the aluminum surfaces are immersed in the diluted aqueous polymer dispersion, and wherein the nonaqueous ingredient content of the diluted aqueous polymer dispersion is in the range of from about 0.5 to about 10% by weight.

4. A method in accordance with claim 3 wherein said range is from about 1 to about 3% by weight.

5. A method in accordance with claim 1 wherein the aluminum is treated with the diluted aqueous polymer dispersion by wiping, brushing or sponging, and wherein the nonaqueous component content of the diluted aqeuous polymer dispersion is in the range of from about 10 to about 25% by weight.

6. A method in accordance with claim 1 wherein the acrylate copolymer of component B. contains
   a. from about 1 to about 15% by weight of an acid group-containing monomer,
   b. from about 30 to about 69% by weight of a monomer which forms a homopolymer having a glass temperature below 20° C., and
   c. from about 30 to about 69% of a monomer which forms a homopolymer having a glass temperature above 20° C.

7. A method in accordance with claim 6 wherein monomer a. is an ethylenically unsaturated carboxylic acid or an ethylenically unsaturated acid of sulfur.

8. A method in accordance with claim 7 wherein monomer a. is one or more of acrylic acid, methacrylic acid, itaconic acid, maleic acid, semiesters of maleic acid, 2-acrylamido-2-methylpropane sulfonic acid, and vinyl sulfonic acid.

9. A method in accordance with claim 6 wherein monomer b. is at least one of an ester of acrylic acid with a $C_1$-$C_8$ alkanol and an ester of methacrylic acid with a $C_4$-$C_8$ alkanol.

10. A method in accordance with claim 6 wherein monomer c. is at least one of styrene and a methacrylic acid ester with a $C_1$-$C_3$ alkanol.

11. A method in accordance with claim 1 wherein component C. is at least one water soluble salt of calcium, magnesium, zinc, or zirconium.

12. A method in accordance with claim 1 wherein component D. is one or more of a phthalic acid ester, a phosphoric acid ester, an ester of an acyclic aliphatic dicarboxylic acid, a polyester of an aliphatic dicarboxylic acid wherein the polyester has a molecular weight of from about 850 to about 8,000, a polyester of an aromatic dicarboxylic acid wherein the polyester has a molecular weight of from about 850 to about 8,000, a fatty acid ester, and a citric acid ester.

13. A method in accordance with claim 1 wherein component E. is one or more of a water soluble, high boiling monohydric or polyhydric alcohol, and a $C_1$-$C_5$ alkyl mono- or diether of a glycol or a diglycol.

14. A method in accordance with claim 13 wherein component E. is one or more of ethylene glycol, propylene glycol, dimers of ethylene glycol or propylene glycol, trimers of ethylene glycol or propylene glycol, mono-or dialkylethers of the foregoing with a $C_1$-$C_6$ alkanol.

15. A method in accordance with claim 1 wherein component F. is a mixture of
   a. one or more of an ethoxylate of a fatty alcohol, an ethoxylate of an alkyl phenol, a sulfate or sulfonate of either of the foregoing, and an alkylbenzene sulfonate, and
   b. one or more of compounds containing a perfluorinated $C_6$-$C_{12}$ alkyl chain and a —COOH group, an —$SO_3H$ group, and/or a —$CONR_2$ group wherein $R_2$ is hydrogen or lower alkyl.

16. A method in accordance with claim 1 wherein the oxidized polyethylene of component G. has a wax-like consistency and is present in pressure emulsified form.

17. A method in accordance with claim 1 wherein component H. is a copolymer of styrene and maleic acid anhydride containing from about 20 to about 50 mole % of maleic acid anhydride units, maleic acid units or alkali or ammonium salts of such units.

18. A method in accordance with claim 1 wherein the diluted polymer dispersion has a pH value of from about 6 to about 9.

19. A method in accordance with claim 18 wherein the pH is from about 7 to about 8.5.

20. A method in accordance with claim 1 wherein from about 15 to about 30% of component B. is present in the aqueous polymer dispersion.

21. A method in accordance with claim 1 wherein from about 5 to about 25% of component E. is present in the aqeuous polymer dispersion.

22. A method in accordance with claim 1 wherein the method is carried out at ambient temperature.

23. A method in accordance with claim 1 wherein the aluminum surfaces to which the diluted polymer dispersion has been applied are drained, and then dried at a temperature above the film forming temperature of component B. in the range of from about 40 to about 100° C.

24. A method in accordance with claim 1 wherein said component C is a complex of said organic salt with ammonia or an amine.

25. A method in accordance with claim 11 wherein said component C is a complex of said organic salt with ammonia or an amine.

* * * * *